United States Patent
Reinholdt

(10) Patent No.: US 10,974,842 B2
(45) Date of Patent: Apr. 13, 2021

(54) LOW ENGAGEMENT FORCE AERIAL REFUELING COUPLING

(71) Applicant: Eaton Intelligent Power Limited, Dublin (IE)

(72) Inventor: James W. Reinholdt, San Clemente, CA (US)

(73) Assignee: Eaton Intelligent Power Limited, Dublin (IE)

( * ) Notice: Subject to any disclaimer, the term of this patent is extended or adjusted under 35 U.S.C. 154(b) by 362 days.

(21) Appl. No.: 15/767,782

(22) PCT Filed: Oct. 14, 2016

(86) PCT No.: PCT/US2016/057094
§ 371 (c)(1),
(2) Date: Apr. 12, 2018

(87) PCT Pub. No.: WO2017/066607
PCT Pub. Date: Apr. 20, 2017

(65) Prior Publication Data
US 2018/0297715 A1    Oct. 18, 2018

Related U.S. Application Data

(60) Provisional application No. 62/242,770, filed on Oct. 16, 2015.

(51) Int. Cl.
*B64D 39/06* (2006.01)
*F16L 37/32* (2006.01)

(52) U.S. Cl.
CPC .............. *B64D 39/06* (2013.01); *F16L 37/32* (2013.01)

(58) Field of Classification Search
CPC .......... B64D 39/00; B64D 39/06; F16L 37/32
See application file for complete search history.

(56) References Cited

U.S. PATENT DOCUMENTS 2,767,943 A * 10/1956 Janney, II ............... B64D 39/00
                                                                    244/135 A
2,946,605 A *  7/1960 Mosher .................. B64D 39/06
                                                                    137/614.03
(Continued)

FOREIGN PATENT DOCUMENTS

| GB | 861729 A | 2/1961 |
| RU | 1778983 C | 7/1995 |
| WO | 2014170635 A1 | 10/2014 |

OTHER PUBLICATIONS

Database WPI, Week 199613, Thomas Scientific, London, GB; AN 1996-127275 XP002766236.
(Continued)

*Primary Examiner* — Benjamin P Lee
(74) *Attorney, Agent, or Firm* — Fishman Stewart PLLC

(57) ABSTRACT

A system including a coupling (100) configured to couple a hose associated with a tanker aircraft to a nozzle associated with a receiving aircraft. The coupling may include a housing that houses a main poppet and a pilot poppet. The main poppet and the pilot poppet may control fuel flow from the tanker aircraft to the receiving aircraft. The coupling may also include an opening disposed at a first side of the housing. The opening may receive the fuel nozzle. An orifice may be disposed on a second side of the housing, the orifice may permit fuel to flow into the housing. The system may also include a low drag drogue configured to house the coupling. The system may also include a nozzle tip configured to open the pilot poppet and the main poppet, wherein fuel flows to the receiving aircraft in response to the main poppet being open.

19 Claims, 6 Drawing Sheets

(56) References Cited

U.S. PATENT DOCUMENTS

| | | | | |
|---|---|---|---|---|
| 3,059,895 | A | * | 10/1962 | Brown .................. B64D 39/06 |
| | | | | 251/149.7 |
| 3,132,667 | A | * | 5/1964 | Baker .................. F16L 37/413 |
| | | | | 137/630.15 |
| 3,475,001 | A | * | 10/1969 | Hieber .................. B64D 39/06 |
| | | | | 251/149.8 |
| 3,498,324 | A | | 3/1970 | Breuning |
| 3,851,852 | A | * | 12/1974 | Blanchard ............. B64D 39/06 |
| | | | | 251/149.1 |
| 3,961,645 | A | * | 6/1976 | Kagan .................... F16L 37/23 |
| | | | | 137/630.15 |
| 3,976,100 | A | | 8/1976 | Souslin |
| 4,549,577 | A | * | 10/1985 | Kugler ................... F16L 37/32 |
| | | | | 137/614.04 |
| 4,582,295 | A | * | 4/1986 | Kugler ................... F16L 37/23 |
| | | | | 137/493.6 |
| 6,095,190 | A | * | 8/2000 | Wilcox ................... F16L 37/23 |
| | | | | 137/614 |
| 6,736,164 | B2 | * | 5/2004 | Pozgainer ........ B60K 15/03519 |
| | | | | 137/516.27 |
| 2015/0027549 | A1 | * | 1/2015 | Murray .................. F16L 37/32 |
| | | | | 137/1 |
| 2017/0138522 | A1 | * | 5/2017 | Foner ..................... F16L 37/34 |
| 2019/0264853 | A1 | * | 8/2019 | Reinholdt ............... F16L 37/38 |

OTHER PUBLICATIONS

International Search Report, PCT/US2016/057094, dated Feb. 9, 2017.
European Office Action, 16784757.3, dated May 15, 2020.

\* cited by examiner

10,974,842 B2

LOW ENGAGEMENT FORCE AERIAL REFUELING COUPLING

CROSS-REFERENCE TO RELATED APPLICATION

This application is a National Stage Patent Application of International Patent Application No. PCT/US2016/057094, filed Oct. 14, 2016, which claims the benefit of U.S. Provisional Application Ser. No. 62/242,770, filed Oct. 16, 2015, the contents of both are incorporated by reference in their entireties.

TECHNICAL FIELD

The present disclosure relates to a system for aerial refueling, including a system for low engagement force aerial refueling coupling.

BACKGROUND

Aerial refueling systems rely on refueling couplings that couple a tanker aircraft (i.e., the aircraft supplying the fuel) with a receiving aircraft. Typically, such couplings have a high engagement load, which requires the receiving aircraft to approach the tanker aircraft at relatively high speeds or requires a high drag drogue which increases tension forces on an aerial refueling hose deployed by the tanker aircraft. Requiring the receiving aircraft to approach at relatively high speeds can require caution. Additionally, the use of a high drag drogue, which is disposed at a refueling end of the hose, may make the hose prone to breaking during disengagement of the coupling with the receiving aircraft, which may involve safety issues. Accordingly, a system that reduces engagement loads, allowing the receiving aircraft to approach at relatively lower speeds, and that reduces tension forces on the aerial refueling hose through the use of a low drag drogue, can be desirable.

SUMMARY

A system for refueling aircraft midflight may include an aerial refueling coupling configured to couple a refueling hose associated with a tanker aircraft to a fuel nozzle associated with a receiving aircraft. The coupling may include a main poppet valve and a pilot poppet valve. The main poppet valve and the pilot poppet valve may be disposed within a housing. Each of the main poppet valve and the pilot poppet valve may be configured to control fuel flow from the tanker aircraft to the receiving aircraft. The coupling may also include an opening disposed at a first side of the housing. The opening may be configured to receive the fuel nozzle and an orifice disposed on a second side of the housing, the second side may be opposed to the first side and the orifice may be configured to allow fuel to flow from the tanker aircraft into the housing. The system may also include a low drag drogue disposed at a fueling end of the hose, the coupling being disposed within the drogue. The system may also include a nozzle tip disposed at an end of the fuel nozzle and being configured to open the pilot poppet valve and the main poppet valve, wherein fuel flows from the housing to the receiving aircraft in response to the main poppet valve being open.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by appended claims.

Figure 1:
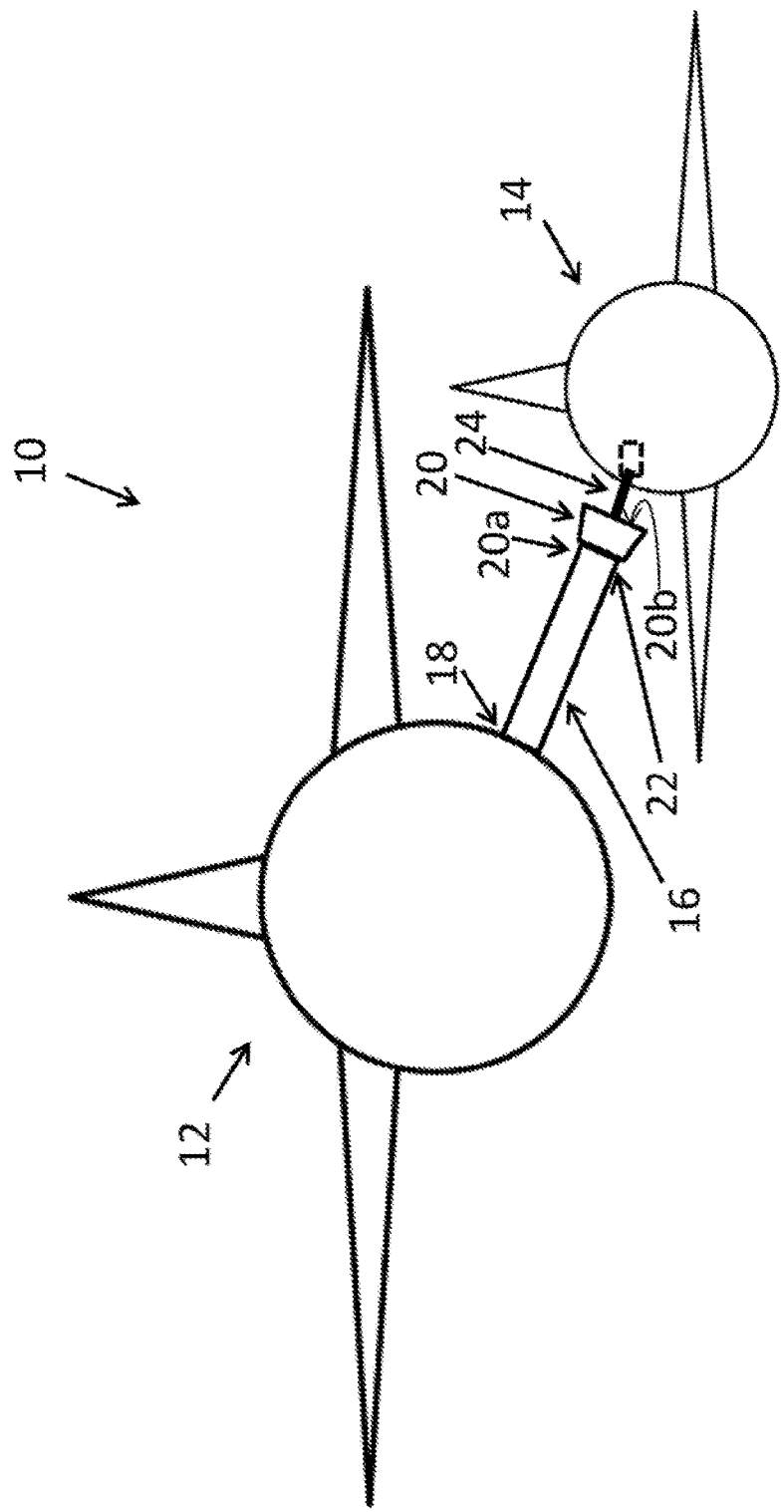
FIG. 1 generally depicts an aerial refueling system according to principles of the present disclosure.
Figure 2:
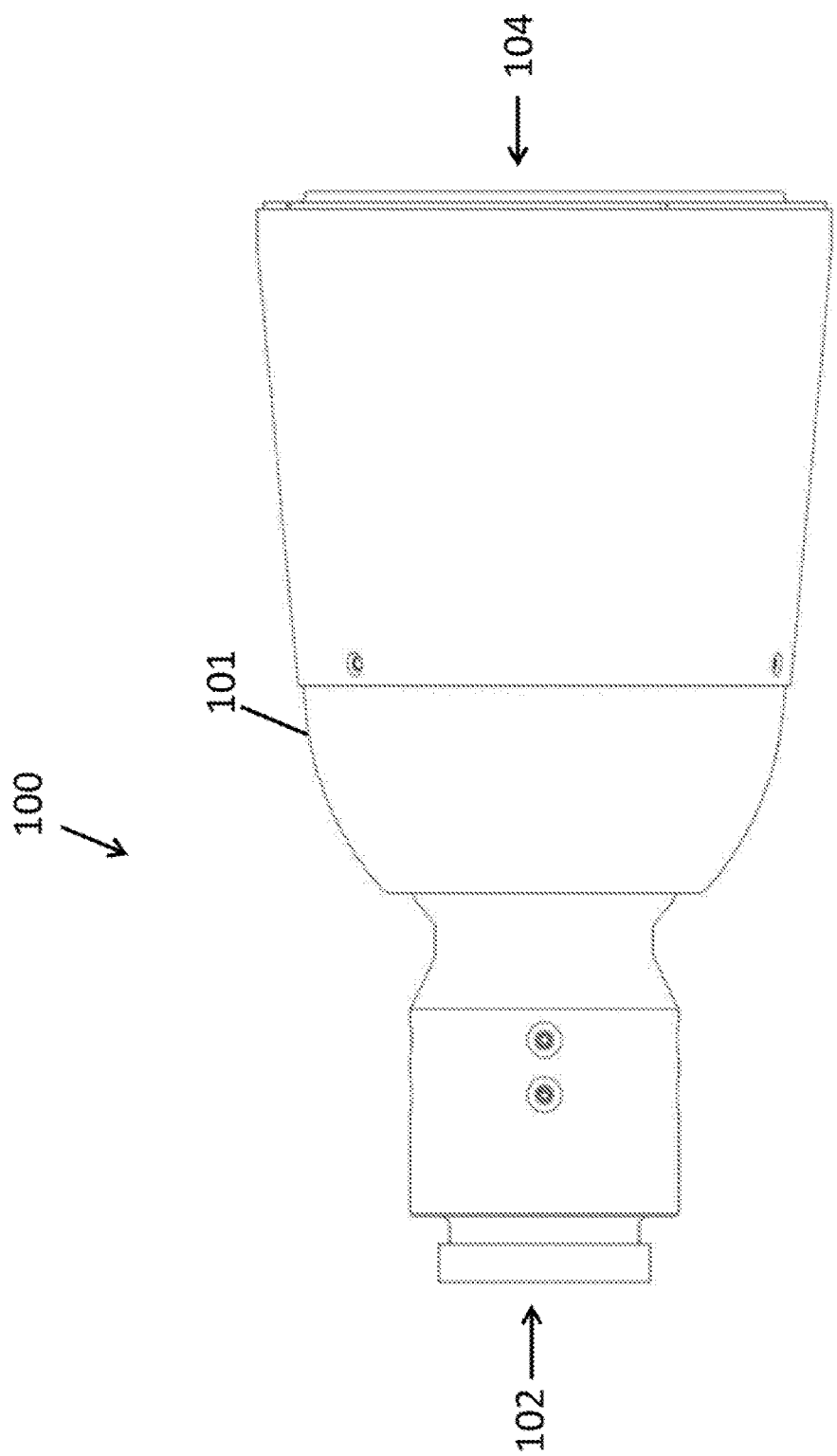
FIG. 2 generally depicts a side view of an aerial refueling coupling according to principles of the present disclosure.

With particular reference to FIG. 1, an aerial refueling system is generally illustrated at 10. Aerial refueling systems generally rely on aerial refueling couplings (such as aerial refueling coupling 100 as illustrated in FIGS. 2-6 and described in more detail below) that couple a tanker aircraft 12 (i.e., the aircraft supplying fuel) with a receiving aircraft 14 (i.e., an aircraft receiving the fuel from the tanker aircraft). The coupling may include an outer body 101 (such as generally illustrated in FIG. 2), which may be comprised of one or more components. It is understood that while only an airplane is illustrated in FIG. 1, the principles of the present disclosure apply to helicopters, airplanes, jets, or other suitable aircraft. During aerial refueling events, both the tanker aircraft 12 and the receiving aircraft 14 are in flight. In order to deliver fuel to the receiving aircraft 14, the tanker aircraft 12 deploys a refueling hose 16. Typically, refueling couplings requires a relatively high engagement load. For example only, the coupling may include a main poppet valve. In order for fuel to pass from the coupling to the receiving aircraft 14, the main poppet valve must be opened. Typically, this requires a relatively large amount of force generated by a portion of the receiving aircraft 14. In order to generate enough force to open the main poppet valve, the receiving aircraft 14 may approach the tanker aircraft 12 at relatively high speeds while the tanker aircraft 12 maintains similar high speeds, which may pose issues to the refueling components, the tanker aircraft 12, the receiving aircraft 14, and personnel on board each aircraft.

The refueling hose 16 is connected at a first or tanker end 18 to the tanker aircraft 12. The refueling hose 16 may include a drogue 20 and an aerial fueling coupling, such as the aerial fueling coupling 100 generally illustrated in FIG. 2, at a second or fueling end 22 of the hose 16. The drogue 20 may be a high drag drogue or a low drag drogue. High drag drogues increase tension forces on the fueling end 22 of the aerial refueling hose 16, which, in instances, could result in damage to the coupling, hose 16, and/or portions of the receiving aircraft 14 when the coupling is disengaged from the receiving aircraft 14.

As will be described in greater detail below, some embodiments of the present disclosure utilize a low drag drogue in order to minimize tension force on the fueling end 22 of the hose 16. In embodiments of the present disclosure, an aerial fueling coupling, such as the aerial refueling coupling 100, the drogue 10 may be attached to an outlet end of the coupling 100. A narrow end 20a of the drogue 20 may be attached or coupled to the outlet end of the coupling 100 while a wide end 20b of the drogue 20 may be configured to stabilize the coupling 100 while the hose 16 is being deployed from the tanker aircraft 12. For example, the drogue 20 may act like a parachute at the fueling end 22 of the coupling 100 to help stabilize the hose 16 and better ensure the hose 16 does not get caught in jet wash or wind, thereby causing the coupling 100 to be unstable and difficult, or extremely challenging, for the receiving aircraft 14 to engage with the coupling 100.

During refueling events, the drogue 20 may stabilize the coupling 100 to facilitate engagement of a fueling nozzle 24 associated with the receiving aircraft 14. The nozzle 24 may be a fuel nozzle that is fixed to the receiving aircraft 14 or mechanically extends from the receiving aircraft 14 in order to engage the coupling 100. It is understood that the fuel nozzle 24 may comprise suitable fuel nozzles associated with a variety aircraft. The principle of the present disclosure apply to fueling events that utilize any suitable nozzle associated with any suitable aircraft The wide end 20b of the drogue 20 may also provide a funnel like opening that may aid insertion of the fuel nozzle 24 into the drogue 20, and accordingly, into the coupling 100. When the fuel nozzle 24 is inserted into the drogue 20, the fueling coupling 100 receives a nozzle tip 140 (illustrated generally in FIGS. 4, 5, and 6) associated with the fuel nozzle 24.

During fueling events, fuel may be delivered through the hose 16 to the coupling 100. As will be described in greater detail below, when the coupling 100 receives the fuel nozzle 24, fuel from the hose 16 may be released and permitted to flow through the coupling 100 and into the fuel nozzle 24 and, thereby, into the receiving aircraft 14.

Figure 3:
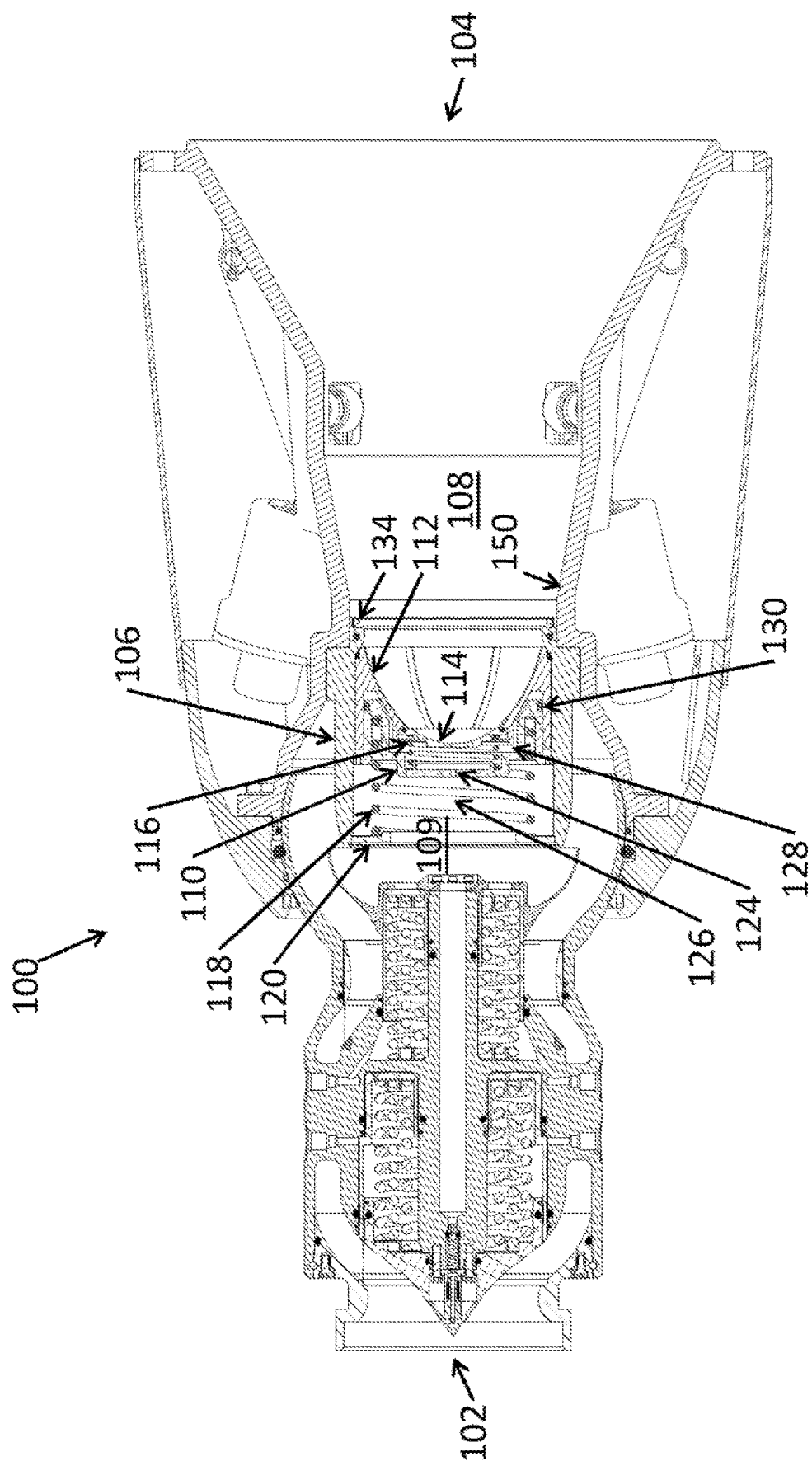
FIG. 3 generally depicts a cross-sectional view of the aerial refueling coupling of FIG. 1.

With reference to FIGS. 2 and 3, an aerial refueling coupling according to the principles of the present disclosure is generally illustrated at 100. With particular reference to FIG. 3, a cross-sectional view of the aerial refueling coupling 100 is generally illustrated. The coupling 100 may include a hose connection end 102 and a nozzle receiving end 104. The hose connection end 102 may be configured to attach and/or couple the coupling 100 to the fueling end 22 of the hose 16. Additionally, the nozzle receiving end 104 may be configured to receive the fuel nozzle 24.

The coupling 100 may also include a housing (or "cage") 106 that may, for example, be disposed at or near a midpoint of the coupling 100. In embodiments, the housing 106 may be provided and secured within a latch housing 150, such as generally illustrated. The housing 106 may include a first housing side 108 and a second housing side 109. The first housing side 108 may be disposed on a side of the housing 106 that is proximate to the nozzle receiving end 104 and the second housing side 109 may be disposed on a side of the housing 106 that is proximate to the hose connection end 102. The first housing side 108 may be configured to receive a nozzle tip 140 of the fuel nozzle 24.

Typically, the housing 106 may be configured to house and/or guide a main poppet valve 112. In order for high volumes of fuel to flow through the coupling into the receiving aircraft 14, the main poppet valve 112 should be fully opened. In order to open the main poppet valve 112, a sustained force may be applied to the main poppet valve 112 by a portion of the receiving aircraft 14. Typically, the force required to open the main poppet valve 112 may be, by example only, 155 pounds when the coupling 100 internal pressure is 10 pounds per square inch gage (psig). In order to generate the force required to open the main poppet valve 112, the receiving aircraft 14 may be required to approach the coupling 100 at a relatively high speed. For example only, a relatively high speed may be 10 feet per second.

In embodiments of the present disclosure, the housing 106 may be configured to house a main poppet valve 112, a pilot poppet valve 114, a housing cover 110, and a spring retainer 120. The pilot poppet valve 114 may comprise an associated pilot poppet spring 116 and the main poppet valve 112 may comprise a main poppet spring 118. Each of the pilot poppet spring 116 and the main poppet spring 118 may be housed in the housing 106. During refueling events, a sustained force may be applied to the pilot poppet valve 114 in order to force the pilot poppet valve 114 open. The sustained force may be applied, by way of non-limiting example only, by the nozzle tip 140. By way of non-limiting example, the sustained force may be less or substantially less than 155 pounds. In order to generate the required force to open the pilot poppet valve 114, the receiving aircraft 14 may approach the tanker aircraft 12, by way of non-limiting example only, at a lower speed than the relatively high speed. For example only, the lower approach speed may be 1 foot per second. In order for the pilot poppet valve 114 to open and remain open, the sustained force applied to the pilot poppet valve 114 must be greater than a force being applied on the pilot poppet valve 114 by the pilot poppet spring 116 and a force applied on the pilot poppet valve 114 by a pressure in a housing volume 128, which will be explained in greater detail below. The pilot poppet spring 116, either individually or together with the pressure in the housing volume 128, may apply a force to the pilot poppet valve 114 strong enough to keep the pilot poppet valve 114 closed until a force greater than the force applied by the pilot poppet spring 116 is applied to the pilot poppet valve 114.

After the pilot poppet valve 114 has been opened, a sustained force may be applied to the main poppet valve 112 in order to force the main poppet valve 112 open. By way of non-limiting example, the sustained force may, for example, be less or substantially less than 155 pounds. In another example, without limitation, the sustained force may, for example, be 155 pounds. In order for the main poppet valve 112 to open, the applied/sustained force directed to the main poppet valve 112 must be greater than a force being applied on the main poppet valve 112 by the pilot poppet spring 116 and the pressure in housing volume 128 (also referred to as a first housing volume) and housing volume 126 (also referred to as a second housing volume). The foregoing may generally refer to the main poppet valve 112 cracking open. That is, prior to contacting the housing cover 110, the main poppet valve 112 will also be pushing against the main poppet spring 118. In that case, there will be a first pressure force associated with the first housing volume 128 and a second pressure force associated with the second housing volume 126. The two pressure "zones"—i.e., pressures associated with the first and second housing volumes 128, 126—may be created by a dynamic seal 130. In embodiments, the first housing volume 128 and the second housing volume 126 comprise volumes provided on opposing sides of the orifice 124 and housing cover 110 (see, e.g., FIG. 4). In embodiments, the pressures in the first and second housing volumes 128, 124 generate forces that urge or push the main poppet valve 112 and the pilot poppet valve 114 towards their closed positions. It is noted that because the area/volume associated with the main poppet valve 112 that the housing volume acts on is small, it will not generate much force even if the pressure in the second housing volume 126 is relatively high. In embodiments, after the main poppet valve 112 opens, it can continue to open until it contacts the housing cover 110. At that point, the main poppet spring 118, the pilot poppet spring 116, and the pressure in the housing volume 128 may apply a force to the main poppet valve 112 sufficiently strong enough to keep the main poppet valve 112 from fully opening until a force greater than the force applied by the main poppet spring 118, the pilot poppet spring 116, and the pressure in housing volume 128 is applied to the main poppet valve 112. In embodiments of the present disclosure, and described in more detail below, the nozzle tip 140 associated with the fuel nozzle 24 may be configured to apply the sustaining force necessary to open the pilot poppet valve 114 and the main poppet valve 112. For example only, the nozzle tip 140 may apply a sustained force to the pilot poppet valve 114, as described. The pilot poppet valve 114 may then break contact with the main poppet valve 112 as a result of the nozzle tip 140 applying the force to the pilot poppet valve 114. The nozzle tip 140 may then push the main poppet valve 112 open.

The coupling 100 may include a housing cover 110 that may be disposed on the second housing side 109 of the housing 106. The housing cover 110 may include a orifice 124. The orifice 124 may connect a fuel flow path (e.g., 144) with an interior portion of the housing 106. In embodiments of the present disclosure, during low speed engagements (i.e., when the tanker aircraft 12 and the receiving aircraft 14 maintain relatively low approach speeds, such as 1 foot per second), a volume 128 of the housing 106 may be connected to the fuel nozzle 24 when the nozzle tip 140 of the fuel nozzle 24 applies a force on the pilot poppet valve 114, thereby opening the pilot poppet valve 114. This permits the nozzle tip 140 of the fuel nozzle 24 to apply a relatively low sustaining force on the pilot poppet valve 114 and the main poppet valve 112. By way of non-limiting example, the relatively low sustaining force may be lower than about 155 pounds. The housing volume 128 may be disposed behind the main poppet valve 112 and the pilot poppet valve 114.

The coupling 100 may also include a dynamic seal 130. The dynamic seal 130 may act on a side of the main poppet valve 112 to limit fuel leakage around the main poppet valve 112. The coupling 100 may also include a spring retainer 120 that is integral with, or connected or mounted to, the housing 106 to, inter alia, at least partially retain the main poppet spring 118. The coupling 100 may also include a coupling seal 134 disposed at the first housing side 108. In embodiments of the present disclosure, the fuel nozzle 24 may engage the coupling 100. For example only, the nozzle tip 140 of the fuel nozzle 24 may apply a sustained force on the pilot poppet valve 114. When the nozzle tip 140 engages the latch housing 150, the fuel nozzle 24 forms a seal with the coupling seal 134. After the fuel nozzle 24 forms the seal with the coupling seal 134, the nozzle tip 140 may then force open the pilot poppet valve 114.

In embodiments of the present disclosure, a flow area associated with the pilot poppet valve 114 may be significantly larger than a flow area associated with the orifice 124. This may allow fuel pressure in the housing volume 128, behind the main poppet valve 112 and the pilot poppet valve 114, to approximately equalize with a pressure within components of a fuel system associated with the receiving aircraft 14. The components of the fuel system may include, but is not limited to, the fuel nozzle 24, fuel tanks, fuel lines and hoses, or other suitable components.

Figure 4:
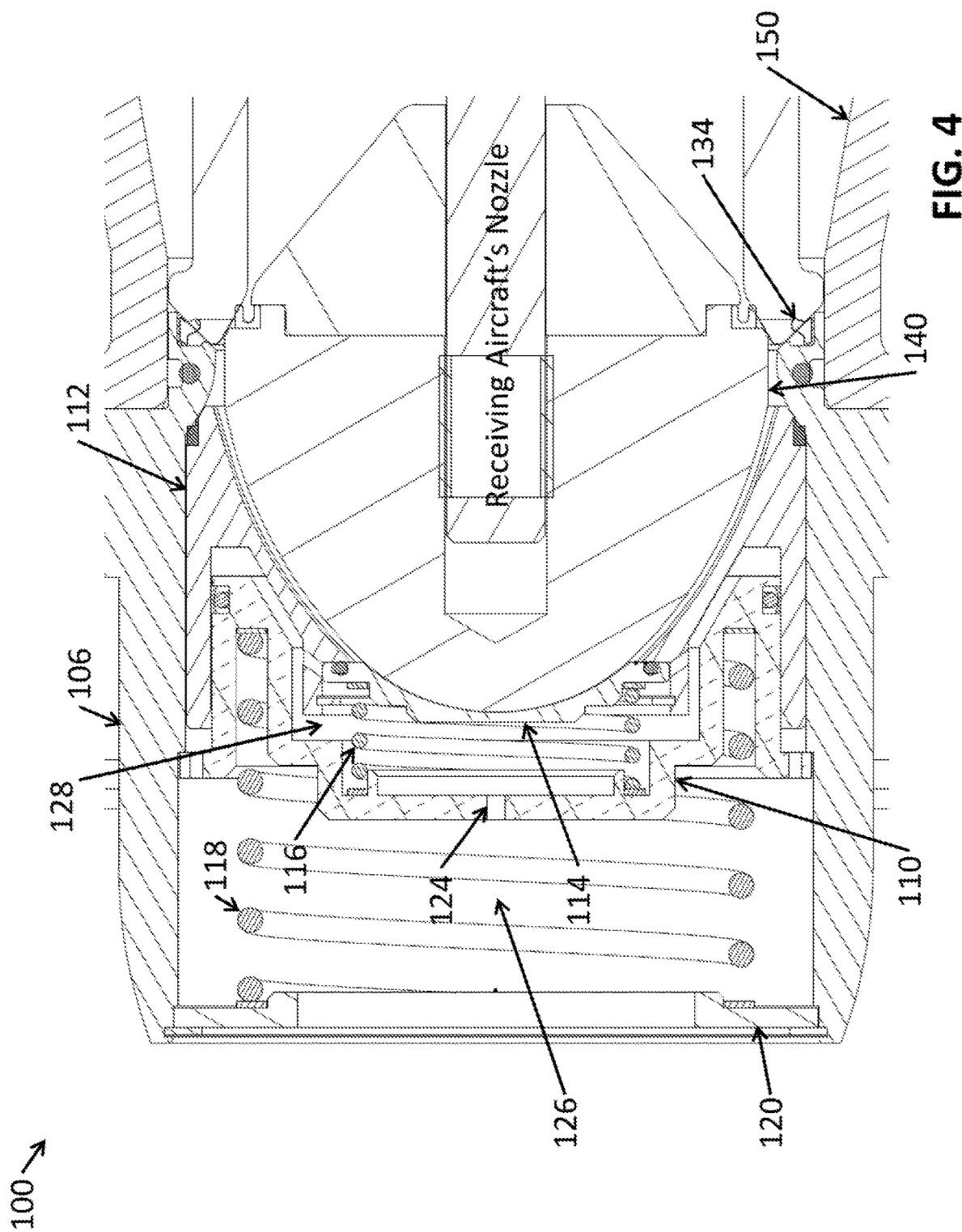
FIG. 4 generally depicts a cross-sectional view of an aerial refueling coupling engaging a fueling nozzle according to principles of the present disclosure.
Figure 5:
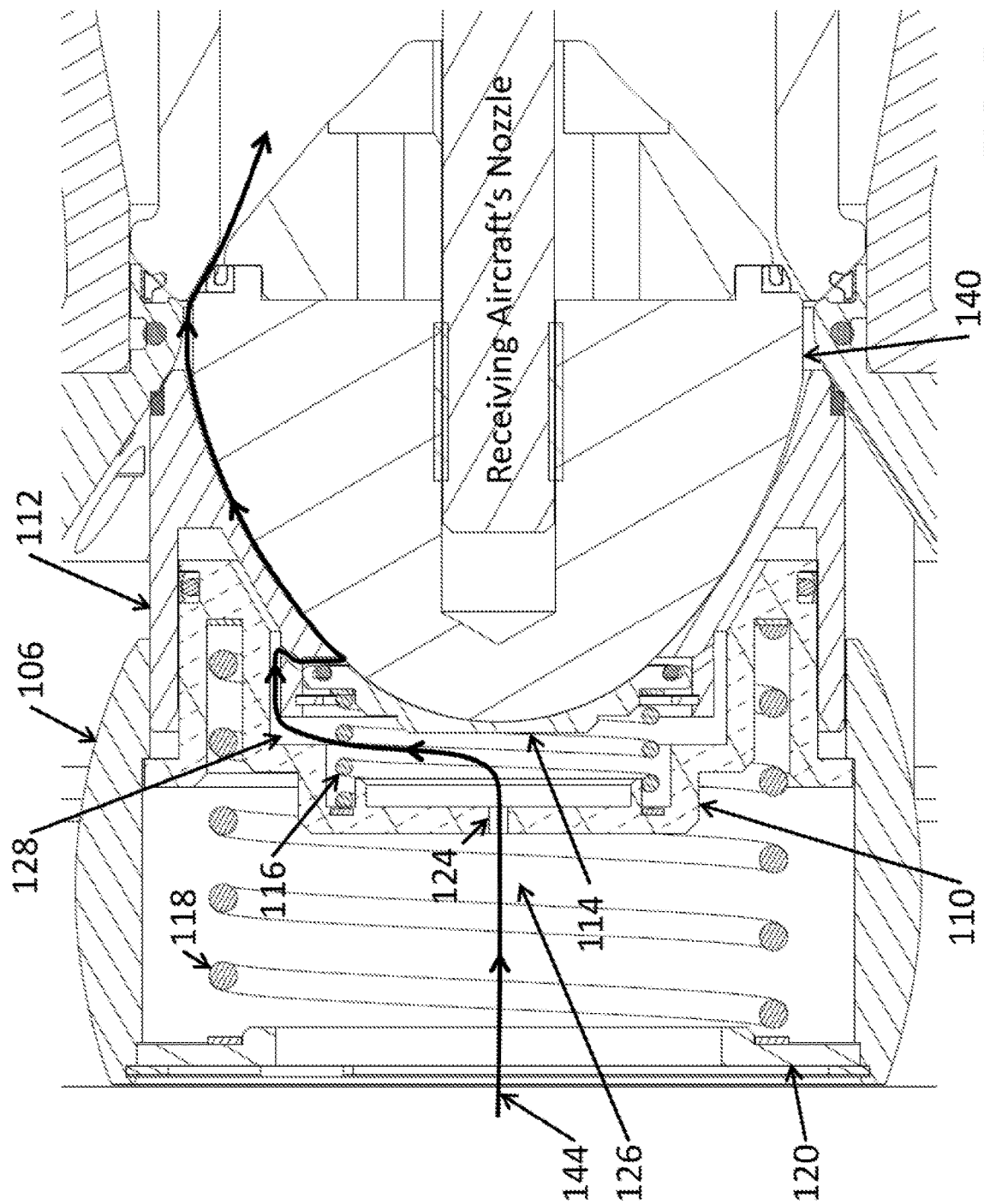
FIG. 5 generally illustrates fuel flow through the open pilot poppet section of the aerial refueling coupling of FIG. 4.
Figure 6:
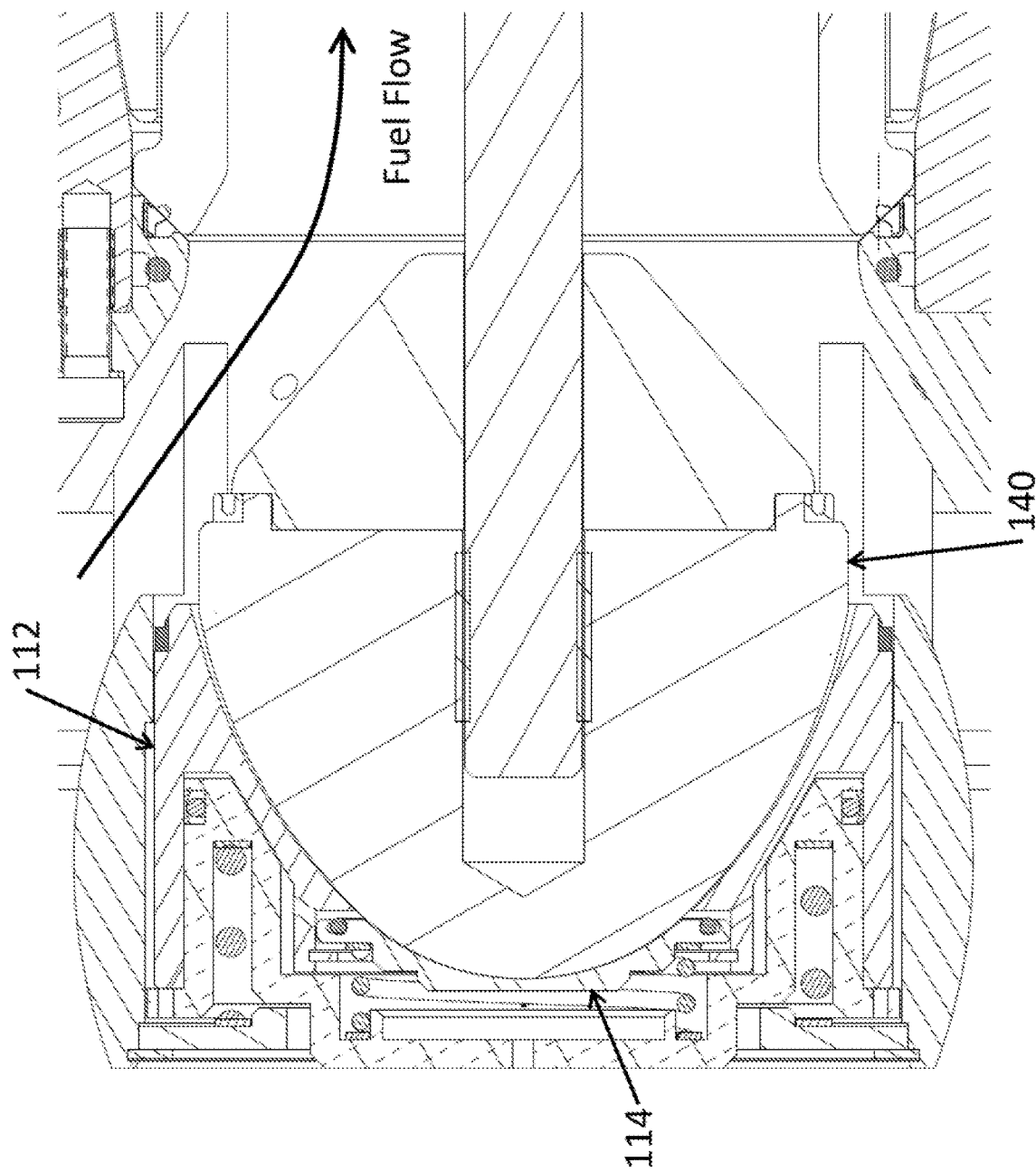
FIG. 6 generally illustrates a cross-sectional view of the aerial refueling coupling of FIG. 1 in a position that permits fuel to flow from a tanker aircraft to a receiving aircraft.

Referring now to FIGS. 4, 5, and 6, a cross-sectional view of a portion of the aerial fueling coupling 100 is generally illustrated. As described above, the nozzle tip 140 may force open the pilot poppet valve 114. After the nozzle tip 140 forces open the pilot poppet valve 114, the nozzle tip 140 may apply a sustained force on the main poppet valve 112 great enough to overcome the force applied by the main poppet spring 118, the force applied by the pilot poppet spring 116 on the main poppet valve 112, and the pressure in housing volume 128. The main poppet valve 112 may then open in response to the force applied to the main poppet valve 112 by the nozzle tip 140. As generally illustrated in FIG. 6, in response to the pilot poppet valve 114 and the main poppet valve 112 being sufficiently open (e.g., full open), fuel from the hose 16 may flow freely through the coupling 100 from the tanker aircraft 12 to the fuel system of the receiving aircraft 14. As generally illustrated in FIG. 5, a fuel flow 144 may follow an intended or a predefined path from the orifice 124 to the fuel system of the receiving aircraft 14. Further, FIG. 5 generally illustrates the coupling 100 with the pilot poppet valve 114 in an open position, in response to the nozzle tip 140 having engaged the pilot poppet valve 114, permitting the fuel flow 144 to follow the intended or predetermined path. Generally illustrated in FIG. 6 is the coupling 100 with the pilot poppet valve 114, after having been engaged, and accordingly opened, by the nozzle tip 140, engaging the main poppet valve 112, and accordingly, opening (e.g., fully opening) the main poppet valve 112.

In embodiments of the present disclosure, the coupling 100 may be utilized when the tanker aircraft 12 and the receiving aircraft 14 maintain relatively high speeds (i.e., a high speed approach engagement). When the coupling 100 is utilized for a high speed engagement, the low engagement force features described above with respect to the tip 140 applying a relatively low sustained force to the main poppet valve 112, may not be required. For example only, and by way of non-limiting example, the housing cover 110 may move with the main poppet 112 so trapped pressure in the housing volume 128 does not impede the opening of the main poppet 112.

In embodiments of the present disclosure, a maximum pressure head in the hose 16 while being trailed by the tanker aircraft 12 may be, for example, on the order of 10 psig. Pressure acting on the main poppet valve 112 may be reduced from, for example, 10 psig to a pressure similar to pressure in the fuel system of the receiving aircraft 14. The pressure in the fuel system of the receiving aircraft 14 may range between an outside ambient air pressure, for an open vent system, to slightly higher than outside ambient air pressure, for closed vent systems. During a low speed engagement, a lower pressure on a back side of the main poppet valve 112 and the pilot poppet valve 114 can significantly reduce the amount of force required to push the main poppet valve 112 open. Accordingly, this reduces the total engagement force between the fuel nozzle 24 and the coupling 100.

It is noted that with embodiments of the present disclosure, the coupling 100 can be configured so that the main poppet valve 112 will have a confined range of motion to translate axially that is constrained (e.g., in the hose connection end 102 direction) by a formation of the housing 106. Moreover, with embodiments, the coupling may have a comparatively smaller volume to fill, and may have a comparatively smaller path volume to fill, when the main poppet valve closes. Such comparatively smaller volumes to fill can permit embodiments of the coupling to close faster and sufficiently fast to meet applicable or necessary closure requirements and/or avoid unacceptable spillage.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. The use of "connected" or "connection" should be construed broadly and is intended to include, without limitation, direct or indirect physical connection and/or electrical connection (e.g., wired and/or wireless). It is intended that all matter contained in the above description or shown in the accompanying drawings shall be interpreted as illustrative only and not limiting. Changes in detail or structure may be made without departing from the present disclosure as defined in the appended claims.

What is claimed is:

1. A refueling coupling comprising:
    an outer body, the outer body including a nozzle receiving end and a hose connection end;
    a housing disposed within the outer body, the housing including a first housing side proximate the nozzle receiving end and a second housing side proximate the hose connection end, the first housing side configured to receive a portion of a fuel nozzle;
    a main poppet valve including a main poppet spring;
    a pilot poppet valve including a pilot poppet spring, and
    a housing cover disposed on the second housing side and including an orifice, the housing cover dividing an interior of the housing into a first housing volume, defined by an interior surface of the second housing side and a surface of the housing cover facing the nozzle receiving end, and a second housing volume, defined by the interior surface of the second housing side and a surface of housing cover facing the hose connection side, the main poppet spring in the first housing volume and the pilot poppet spring in the second housing volume;
    wherein the main poppet valve and the pilot poppet valve are at least partially disposed within the housing; and the orifice is configured to connect a fuel flow path with an interior portion of the housing.

2. The refueling coupling of claim 1, wherein the housing is disposed at or near the midpoint of the coupling.

3. The refueling coupling of claim 1, wherein the outer body is comprised of a plurality of components.

4. The refueling coupling of claim 1, including a spring retainer configured to at least partially retain the main poppet spring.

5. The refueling coupling of claim 4, wherein the spring retainer is connected to the housing.

6. The refueling coupling of claim 1, including a dynamic seal that is configured to act on a side of the main poppet valve and to limit fuel leakage around the main poppet valve.

7. The refueling coupling of claim 1, including a coupling seal disposed on the first housing side, and configured to form a seal when a nozzle tip engages the pilot poppet valve.

8. The refueling coupling of claim 1, including a housing volume disposed behind the main poppet valve and the pilot poppet valve.

9. The refueling coupling of claim 8, wherein a flow area associated with the pilot poppet valve is significantly larger than a flow area associated with the orifice.

10. The refueling coupling of claim 9, wherein fuel pressure in the housing volume behind the main poppet valve and the pilot poppet valve may approximately equalize with a pressure within one or more components of a fuel system of a receiving aircraft.

11. The refueling coupling of claim 8, wherein the housing volume is connected to a fuel nozzle when a nozzle tip of the fuel nozzle applies a force on the pilot poppet valve.

12. The refueling coupling of claim 8, wherein the housing cover is configured to move with the main poppet so trapped pressure in the housing volume does not impede the opening of the main poppet.

13. The refueling coupling of claim 1, wherein the coupling is configured so that for the main poppet valve to open, a force applied to the main poppet valve must be greater than a collective force applied on the main poppet valve by the pilot poppet spring and a pressure in the first housing volume and the second housing volume.

14. The refueling coupling of claim 1, wherein the coupling is configured so that after the main poppet valve opens, it continues to open until it contacts the housing cover.

15. The refueling coupling of claim 8, wherein the coupling is configured so that when the main poppet valve contacts the housing cover, the main poppet spring, the pilot poppet spring, and the pressure in the housing volume apply a force to the main poppet valve to keep the main poppet valve from fully opening until a greater counter force is applied to the main poppet valve.

16. The refueling coupling of claim 1, wherein each of the main poppet valve and the pilot poppet valve are configured to control fuel flow from a tanker aircraft to a receiving aircraft.

17. A system for refueling aircraft in flight comprising:
an aerial refueling coupling configured to couple a refueling hose associated with a tanker aircraft to a fuel nozzle associated with a receiving aircraft, the coupling including:
an outer body, the outer body including a nozzle receiving end and a hose connection end;
a housing disposed within the outer body, the housing including a first housing side proximate the nozzle receiving end and a second housing side proximate the hose connection end, the first housing side configured to receive a portion of a fuel nozzle;
a main poppet valve including a main poppet spring;
a pilot poppet valve including a pilot poppet spring, and
a housing cover disposed on the second housing side and including an orifice;
wherein the main poppet valve and the pilot poppet valve are at least partially disposed within the housing; and the orifice is configured to connect a fuel flow path with an interior portion of the housing; and
a nozzle tip disposed at an end of the fuel nozzle and being configured to open the pilot poppet valve and the main poppet valve, wherein fuel flows from the housing to the receiving aircraft in response to the main poppet valve being open;
wherein a first housing volume and a second housing volume comprise volumes provided on opposing sides of the orifice and housing cover, the orifice connecting the first housing volume and the second housing volume, a first pressure force associated with the first housing volume and a second pressure force associated with the second housing volume generate forces that urge the main poppet valve and the pilot poppet valve towards respective closed positions.

18. The system of claim 14, including a low drag drogue disposed at a fueling end of the hose, the coupling being disposed at least partially within the drogue.

19. A refueling coupling comprising:
an outer body, the outer body including a nozzle receiving end and a hose connection end;
a housing disposed within the outer body, the housing including a first housing side proximate the nozzle receiving end and a second housing side proximate the hose connection end, the first housing side configured to receive a portion of a fuel nozzle;
a main poppet valve including a main poppet spring;
a pilot poppet valve including a pilot poppet spring;
a housing volume disposed behind the main poppet valve and the pilot poppet valve; and
a housing cover disposed on the second housing side and including an orifice;
wherein the main poppet valve and the pilot poppet valve are at least partially disposed within the housing; the orifice is configured to connect a fuel flow path with an interior portion of the housing; and the housing cover is configured to move with the main poppet so trapped pressure in the housing volume does not impede the opening of the main poppet.

* * * * *